April 23, 1935.   R. H. STANTON   1,998,691
SIGNAL AND DISPLAY DEVICE
Filed Aug. 26, 1929   2 Sheets-Sheet 1
Fig.1.
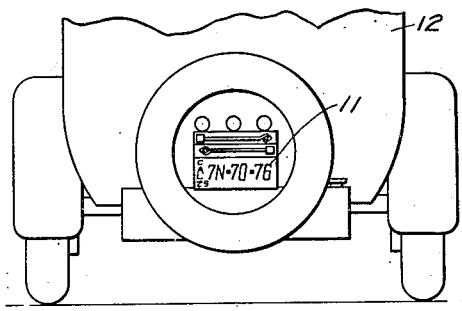
Fig.2.
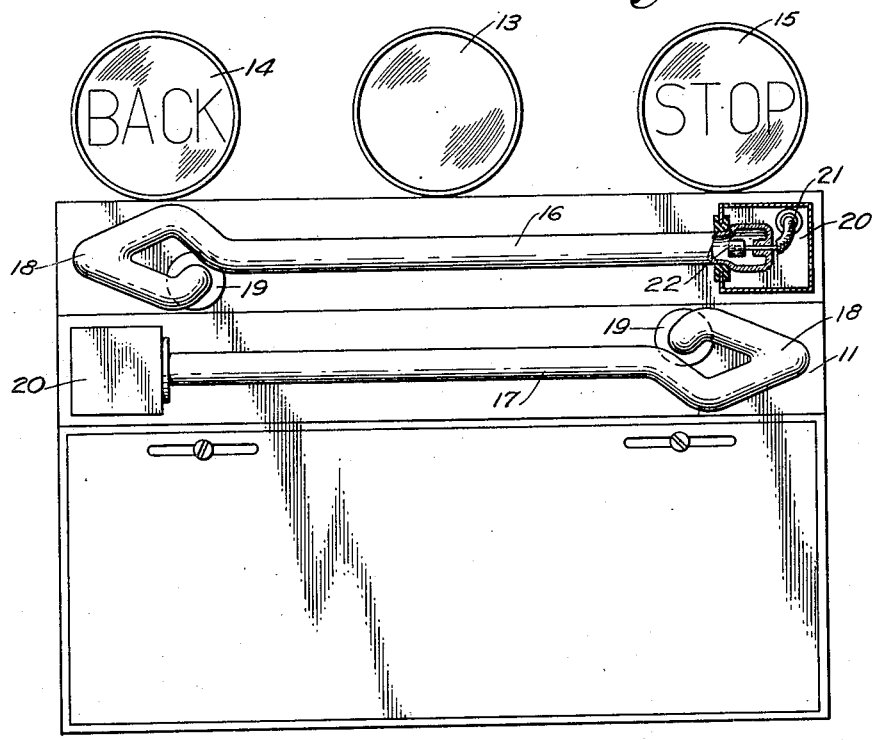
Fig.3.   Fig.4.
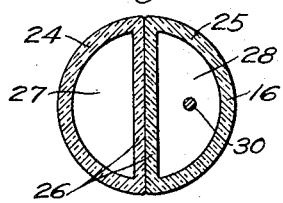 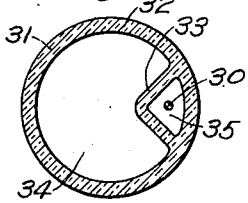
INVENTOR:
Robert H. Stanton,
BY
ATTORNEY.

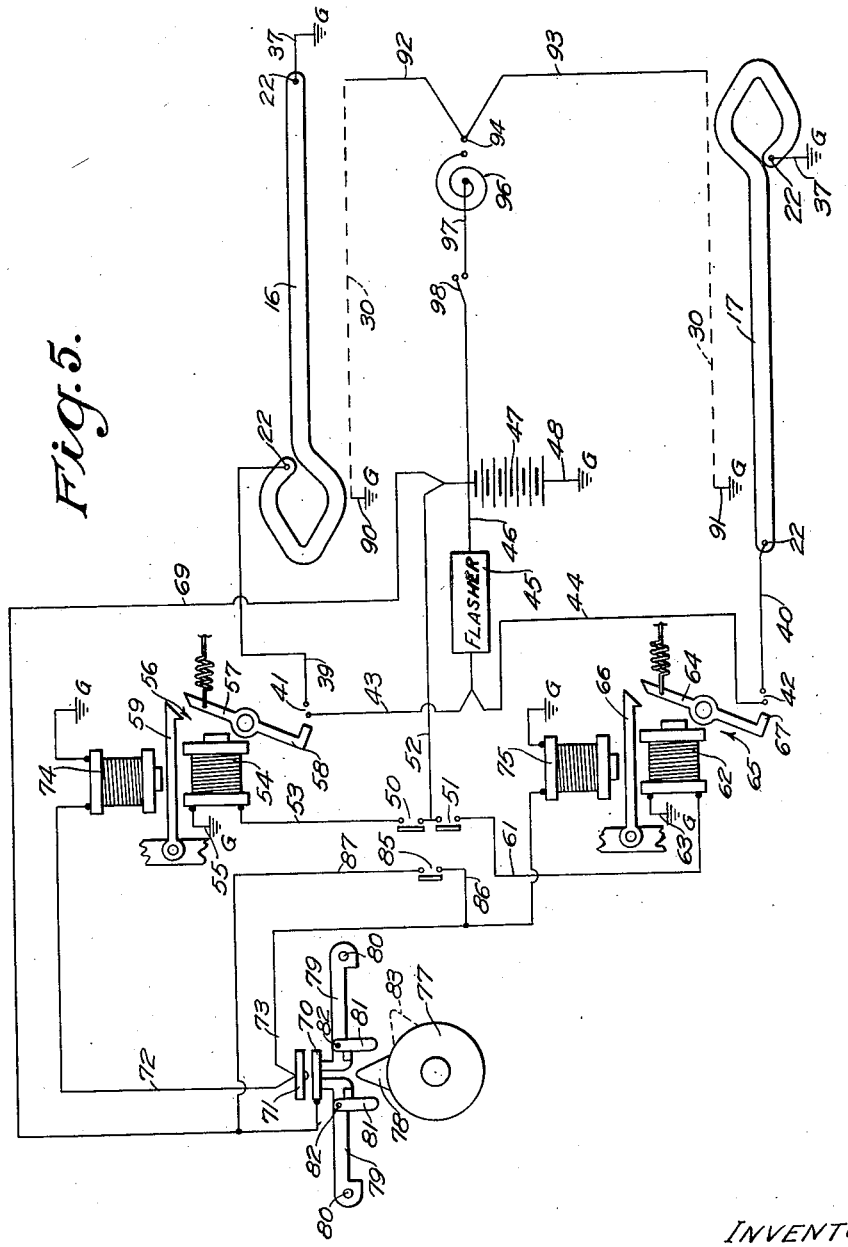

Patented Apr. 23, 1935

1,998,691

UNITED STATES PATENT OFFICE 1,998,691

SIGNAL AND DISPLAY DEVICE

Robert H. Stanton, Pasadena, Calif.

Application August 26, 1929, Serial No. 388,385

15 Claims. (Cl. 176—124)

This invention relates to a method of and apparatus for maintaining the temperature of an illuminable gaseous medium including neon to give a desired character of light and is adapted for use in the manufacture and operation of illuminated display and signal devices. The invention comprehends the use of an illuminable gas or gas mixture which will glow when an electric current is conducted therethrough. Such a gas may be neon and the neon mixtures which are employed to a large extent at the present time in signs, window displays, and for other illuminating purposes, or an illuminable gaseous medium including neon which when heated will maintain constant brilliance.

The invention also comprehends the use of an illuminable member having a gaseous substance therein of such character as previously described, which may be suitably employed as a signal either on a stationary object or on a vehicle such as an automobile.

In the embodiment of my invention disclosed in the present application I have applied the principles thereof to a signal device which may be placed at the back of a vehicle and may be used to indicate to the drivers of following vehicles an intended turn by the driver of the vehicle. Although I have in such embodiment disclosed the elements of my invention, it is to be understood that the invention may be advantageously used in other products or articles of manufacture.

It is well known that certain illuminable gaseous mixtures of the character treated herein will glow in a color which is determined by the characteristics of the mixture employed, but the desired color will not be maintained unless the temperature of the gas is kept above a predetermined value. Also, there is a tendency for certain of these gaseous mixtures to resist instantaneous illumination or instantaneous development of color where the temperature of the gas is below a set value. In signs employing tubes filled with such gaseous substances or mixtures, color effects are determined by the mixture employed, and the desired color produced by the mixture is maintained so long as the temperature of the gas mixture is held at a sufficiently high point.

In certain districts throughout the United States, such as in the North and East, the temperatures to which the tubes are exposed drop during the winter months to a point considerably below that at which the color effect or colored glow of the gas is maintainable. During such periods of low temperature, the supposedly colored gases will not produce the desired color but will glow with a pale white light, thus causing the desired color effects of the sign to be destroyed.

It is an object of my invention to provide a means for heating the gaseous contents of the illuminating tube so that the gaseous mixtures will glow with intended color.

A further object of the invention is to provide an automatic control in the form of a thermostat which will cause actuation of the heating device whenever the temperature drops below a predetermined value, thereby assuring a perfect operation of the illuminated or display equipment at all times.

A further object of the invention is to employ an electrically energized heating element in cooperation with a tube containing a gaseous substance, and it is also an object of the invention to enclose this heating element in a separate tube which extends along or within the transparent container of an illuminable gaseous substance.

A further object of the invention is to provide a signal device for vehicles with tubes or transparent containers, these containers being so formed as to indicate directions in which the driver of the vehicle may intend to turn, to fill these tubes with gaseous mixtures to produce lights of desired color in the separate tubes, to provide an automatically controlled means for heating the tubes or containers when the temperature to which the tubes are exposed drops to a predetermined value, thereby assuring a quick response of the gaseous substances to energization when the controlling switches therefor are closed and also assuring production of the desired colored lights in the respective tubes.

A further object of the invention is to provide a mechanism whereby the driver or operator of a vehicle equipped with the signal device may, by pressure on buttons or closing of contact switches seated at or convenient to the steering wheel of the automobile, cause the illumination of the gaseous contents of a tube or container carried at the back of the vehicle indicating the direction in which he intends to turn.

The invention further includes automatic means for discontinuing the energization of the signal device after the turn has been made, this automatic means being associated with a movable part of the steering mechanism and being so constructed that one or both of the control switches for the illuminable tubes will be opened when such movable part of the steering returns from a position which it assumes during the turning of the vehicle to the position in which it rests when the vehicle is traveling straight ahead.

Further objects and advantages of the invention will be made evident throughout the following part of the specification.

Referring to the drawings which are for illustrative purposes only,

Fig. 1 is a fragmentary view showing a device embodying certain features of the invention attached to an automobile.

Fig. 2 is an elevational view, of somewhat diagrammatic form, showing a supporting member having secured thereon illuminable tubes bent to represent arrows, this view also showing other signal devices attached to the supporting frame and a license plate secured to the frame in a position visible to persons at the rear of the vehicle.

Figs. 3 and 4 are enlarged cross sectional views showing tube combinations or structures which may be employed in the invention for holding the illuminable gaseous mixtures or illuminable gases and for holding a heating element in such position that the gaseous mixtures or gases will be heated.

Fig. 5 is a diagrammatic view showing other elements contributing to and employed in the practice of the invention.

In accordance with the statutes enacted by various of the States, it is necessary to display certain signals on or from a vehicle which is being operated on the public thoroughfares. Customarily it is necessary for the driver to indicate by suitable signal his intention to slow down, stop, or turn right or left. The signal display member 11 shown in Figs. 1 and 2 is of such character as to meet these statute requirements, as, when it is secured to the back of an automobile 12, as indicated in Fig. 1, it displays to those persons to the rear of the vehicle and to operators of following vehicles a driving light 13, backing light or backing signal 14, stop light 15, and left turn and right turn arrows 16 and 17. The arrows 16 and 17 are in the form of gas tubes having the ends thereof bent to the resemblance of arrowheads or spearheads 18. These tubes 16 and 17 have the ends thereof secured in fixtures 19 and 20, wherein electric light wires, such as indicated at 21 in Fig. 2, are extended through the ends of the tubes to electrodes 22 having contact with the illuminable gaseous medium or illuminable gas mixtures contained within the tubes. When electric energy is conducted through the gaseous contents of the tubes 16 and 17, a clear and readily understood signal is imparted to persons situated to the rear of the vehicle.

In the warmer climates a simple tube of the character shown at 16 and 17 may be satisfactorily employed, but where the temperature to which these tubes are exposed is below a desired point it is a feature of my invention to employ means for heating the tubes and the gaseous contents thereof so that there will be a quick response of the gaseous substances to electrical energization and so that the desired color of light will be maintained. In Fig. 3 I show the tube 16 as consisting of two cooperating tubular members or envelopes 24 and 25 of semi-circular cross section so that when the respective flat walls 26 thereof are placed together a substantially cylindrical tubular structure will be formed having spaces 27 and 28 therein in which an illuminable gaseous substance or an illuminable gaseous medium and an electro-responsive heating element 30 may be contained. By conducting electric current through the element 30 within the semi-circular tube 25 heat will be generated which will be transmitted to the tubular member 24 and the gaseous contents thereof, thus preventing the illuminable gaseous contents of the signal device from dropping below the point at which the colored light will be given off in response to electrical energization of the gaseous substances contained in the signal device.

In Fig. 4 I show a tube 31 which may be employed to form the members 16 and 17, this tube having an outer wall 32 and a partition wall 33 which divides the interior of the member 31 into co-extensive spaces 34 and 35. The space 34 may be considerably larger than the space 35 so that a substantial quantity of illuminable gas or gas mixture may be placed therein. The space 35 need only be large enough to receive the heating element 30. In this form of tube, the heating element is supported in such position that a desired heating of the illuminable gas or gas mixture in the space 34 will be accomplished.

In Fig. 5 I indicate the tubes 16 and 17 and with these tubes indicate heating elements 30 which are carried in heating association with the tubes 16 and 17 in a manner such as described relative to Figs. 3 and 4. From an electrode 22 situated at one end, such as the right end, of each tube 16 and 17, connection is made at 37 with a ground G, or, in other words, attachment is made directly to the metal frame of the vehicle. From electrodes 22 at the opposite or leftward ends of the tubes 16 and 17 conductors 39 and 40 are carried to switches 41 and 42, which switches are in turn connected by wires 43 and 44 to an intermittent switch device or flasher 45. This flasher 45 connects through a conductor 46 with the positive pole of a battery 47, the negative pole of which is attached to a ground, as indicated at 48.

It will be perceived that when the switches 41 and 42 are respectively closed, energization of the respective tubes 16 and 17 will be accomplished. To enable the switches 41 and 42 to be closed by the operator of the vehicle I provide button switches 50 and 51 which are connected by a wire 52 with the positive pole of the battery 47. When the switch 50 is closed, current is conducted from the battery 47 through the conductor 52, a conductor 53, and an electromagnet coil 54 to a ground as indicated at 55. The magnet 54 forms part of an electrically actuated and electrically released switch mechanism 56 having an armature 57 with an extension or lever 58 adapted to swing in rightward direction and close the switch 41 when the armature 57 is swung in leftward direction. Therefore, by manipulation of the button switch 50 the energization of the electro-magnet 54 will cause the armature 57 to be swung leftwardly, where it will be engaged by a latch 59 and will result in the closing of the switch 41 so as to cause illumination of the left-hand turn signal formed by the tube 16. In like manner, manipulation of the button switch 51 will permit a flow of energy through a wire 61 and through an electro-magnet 62 which is connected to the ground, as indicated at 63, thereby causing leftward movement of the armature 64 of a switch-operating device 65 into a position where it may be engaged by a latch 66, with the result that a lever 67 associated with the armature 64 will close the switch 42 and cause energization of the right turn signal means represented by the tube 17.

From the previous description it is shown that by manipulation of the button switches 50 or 51 the switches 41 and 42 may be closed and there held until released. The invention provides automatic means for opening the switches 41 and 42 after a turn of the vehicle has been made. For this purpose a conductor 69 is extended from the positive pole of the battery 47 to a contact 70 which is adapted to engage a contact 71, this contact 71 being in turn connected through wires 72 and 73 with releasing magnets 74 and 75 of the switch mechanisms 56 and 65.

77 represents a parti-rotating shaft member forming part of the steering mechanism of the automobile. To this member an engager or lug 78 is attached, this lug 78 being shown in the central position in which it is maintained during the time the front wheels of the vehicle are pointed straight ahead. On either side of this central position of the member 78, levers 79 are hinged on pivots 80, and from the levers 79 hinge dogs 81 are extended into the path of movement traversed by the member 78 when the member 77 is rotated either to the right or to the left, but the members 81 are hinged on pivots 82 so that they may swing outwardly when engaged by the member 78, thus allowing the member 78 to move outwardly in either right-hand or left-hand direction without raising either of the levers 79.

In illustrating the operation of the automatic switch releasing device, let it be assumed that the right-hand signal means represented by the tube 17 has been energized by the closing of the switch 42 in response to manipulation of the button switch 51, and that after the illumination of the signal means 17 the vehicle has been turned to the right in accordance with the intention indicated by the signal. In turning the wheels of the vehicle rightwardly the member 77 will rotate so as to cause the member 78 to move from its central position to a position such as indicated by the dotted lines 83. During its movement into this position, the member 78 will have engaged and passed a dog 81 mounted on a lever 79, this dog 81 swinging rightwardly on its pivot 82 and then falling back into the position in which it is shown after the member 78 has passed on toward the position indicated by the dotted lines 83.

In operating the steering mechanism so as to straighten the front wheels of the vehicle after a turn has been made, the member 78 will be swung or moved from the dotted line position indicated at 83 to the central position indicated in full lines, during which movement the dog 81 will be engaged and forced outwardly with the result of lifting its associated lever 79, which in turn will carry the contact 70 into engagement with the contact 71, thus permitting a flow of current through the conductor 69, the contacts 70 and 71, conductors 72 and 73, and the releasing magnets 74 and 75 which are connected to the ground as indicated.

In response to the energization of the magnets 74 and 75 the latch members 59 and 66 will both be lifted with the result that the armature 64 of the switch mechanism 65 will be released and allowed to swing rightwardly, this movement being accompanied by a leftward movement of the lever 67, whereon the switch 42 will be opened and energization of the contents of the tube 17 discontinued.

It will be perceived that the return of the member 78 to centralized position from a left-hand or right-hand position will accomplish a closing of the switch contacts 70 and 71, and a consequent releasing of the latches 59 and 66 of the switch mechanisms 56 and 65, thereby extinguishing either the right-hand or left-hand signal which has been operated, after the turn indicated by such signal has been made.

In addition to the automatic mechanism for releasing the switch mechanisms 56 and 65, I provide a button switch 85 which, through conductors 86 and 87, may be used to augment the switch represented by the contacts 70 and 71, thereby making it possible for the operator of the vehicle to immediately rectify a mistaken signal by immediately releasing the latches 59 and 66 in response to the manipulation of the button switch 85.

The flasher 45 causes the illumination of the contents of the tubes 16 and 17 to be intermittent, thereby making the existence of the signal immediately perceptible to an observer. This flasher is indicated diagrammatically as the present invention does not concern the construction thereof, and in view of the fact that a commercial form of flasher may be employed for this purpose.

One end of each heating element 30 is connected to the ground, as indicated at 90 and 91, and the opposite ends of these heating elements 30 are connected through wires 92 and 93 with a contact 94 of a thermostat 96 which in turn is connected through a conductor 97 and a switch 98 with the positive pole of the battery 47. Whenever the temperature surrounding the signal device drops to a predetermined point, the thermostat indicated at 96 will close an electric circuit through the heating elements 30, thereby causing heat to be generated for maintaining a desired temperature of operation in the tubes 16 and 17. As previously explained herein, the heating device in combination with tubes filled with illuminable gaseous medium is not confined to the particular embodiment with which this feature of the invention is herein specifically described but is of especial value wherever illuminating devices of a like character are employed under low temperature conditions.

Although I have described the invention with relation to an embodiment consisting of a signal adapted to be attached to the rear of a vehicle, the invention is especially valuable for use on the front of a vehicle or any other part of the vehicle where bright lights are shining. Bright lights on a vehicle, such as the headlights thereof, produce a glare which prevents persons ahead of such lights from making out the signal which is placed adjacent or between the lights. The light delivered by my new signal device is of such a character that it is readily discernible in the presence of another bright light, such as that cast by the headlights of a vehicle. Therefore, by the use of the invention, I am able to equip the front end of an automobile or other vehicle with a signal device which may be discerned by persons in front of the vehicle, the advantages of which are obvious.

I have herein shown and described my invention in simple and practical form, but it is recognized that certain parts or elements thereof are representative of other parts, elements, or mechanisms which may be employed in substantially the same manner to accomplish substantially the same results; therefore, it is to be understood that my invention is not to be limited to the details disclosed herein but shall have the scope set forth in the following claims.

I claim as my invention:

1. An illuminating device of the character described, including: a container for a gaseous illuminable substance; means for passing an electric current therethrough; a heater for heating said container; and a thermostatic control device for causing actuation of said heater when the temperature drops to a predetermined point.

2. An illuminating device of the character described, including: a relatively transparent container; electrodes within said container; circuit means connecting said electrodes with a source of electric energy; an electric heating element associated with said container for heating said container and the contents thereof; and a thermostatic device for permitting the flow of electric energy through said heating element when the temperature falls to a predetermined point.

3. An illuminating device of the character described, including: walls forming a transparent container; walls forming a heating tube cooperative with said container; means for sending electric current through said container so as to energize an illuminable substance held in said container; a heater for heating said container and its enclosed substance; and a thermostatic control device for causing actuation of said heater when the temperature drops to a predetermined point.

4. An illuminating device of the character described, including: transparent tubular walls forming a container; walls forming a heating tube cooperative with said container; electrodes within said container in position for contact with an illuminable substance held in said container; circuit members connecting said electrodes with a source of electric energy; an electric heating element in said heating tube for heating said container and the contents thereof; and a thermostat device for permitting flow of electric energy through said heating element when the temperature falls to a predetermined point.

5. An illuminating device of the character described, including: a supporting structure; a container for an illuminable gaseous substance mounted on said supporting structure; means for sending electric energy through said gaseous substance; a heater for heating said container and the gaseous substance therein; and a thermostat for causing actuation of said heater when the temperature drops to a predetermined value.

6. An illuminating device of the character described, including: a supporting structure; a container for an illuminable gaseous substance mounted on said supporting structure; means for sending electric energy through said gaseous substance; a heater tube co-extensive and cooperative with said container; a heating element in said tube; means for conducting a flow of electric energy through said heating element whereby to heat said container and the contents thereof; and a thermostatically controlled switch for causing a flow of electric energy through said element when the temperature drops to a predetermined value.

7. An illuminating device of the character described, including: a container for a gaseous illuminable substance; means for passing electrical energy through said illuminable substance; means for heating said container; and thermostatic control means for causing actuation of said heating means when the temperature drops to a predetermined point.

8. An illuminating device of the character described, including: a relatively transparent container for a gaseous illuminable substance; electrodes within said container; circuit connecting said electrodes with a source of electric energy; means associated with said container for heating said substance; and thermostatically responsive means for passing a flow of electric energy through said heating means when the temperature falls to a predetermined point.

9. An illuminating device of the character described, including: a translucent container for a gaseous illuminable substance having light-emission characteristics which vary with the temperature to which it is subjected; means for passing electrical energy through said gaseous substance; means for heating said container for the purpose of maintaining the temperature of said gaseous substance at a value to give a desired character of light; and thermostatic control means for causing actuation of said heating means when the temperature drops to a predetermined point.

10. An illuminating device of the character described, including: a container for neon gas; means for sending an electric current therethrough; a heater for heating said container; and a thermostatic control device for causing actuation of said heater when the temperature drops to a predetermined point.

11. An illuminating device of the character described, including: a container for neon gas; means for sending an electric current therethrough; means for heating said container; and means for causing actuation of said heating means when the temperature drops to a predetermined point.

12. An illuminating device of the character described, including: a supporting structure; a container for neon gas mounted on said supporting structure; means for sending electric energy through said neon gas; a heater for heating said container and the gas therein; and a thermostat for causing actuation of said heater when the temperature drops to a predetermined value.

13. An illuminating device of the character described, including: a translucent container for neon gas; electrodes within said container; circuit means connecting said electrodes with a source of electric energy; means associated with said container for heating said gas; and thermostatic responsive means for sending a flow of electric energy through said heating means when the temperature falls to a predetermined point.

14. An illuminating device of the character described, including a display container for an illuminable gaseous medium including neon; a supporting structure for said display container; means for sending electric energy through said gaseous medium; a heater container adjacent the gaseous medium container; a heating element in said heater container; and conductors for connecting said element to a source of electrical energy whereby said heating element is energized to heat said gaseous medium in said display container.

15. An illuminating device of the character described: a transparent envelope; a wall extending lengthwise of said envelope and dividing the interior thereof into a gas chamber and a heating chamber, said gas chamber containing an illuminable gas; means for sending electric current through said gas in said gas chamber to illuminate said gas; and means for heating said heating chamber, whereby heat is transmitted through said wall to heat said gas in said gas chamber.

ROBERT H. STANTON.